United States Patent
Schultes et al.

(10) Patent No.: US 6,803,416 B2
(45) Date of Patent: Oct. 12, 2004

(54) MOULDING COMPOSITIONS WITH DIFFUSING PROPERTIES AND MOULDINGS OBTAINABLE FROM THESE

(75) Inventors: Klaus Schultes, Wiesbaden (DE); Thomas Suefke, Erzhausen (DE); Markus Parusel, Messel (DE); Werner Hoess, Heusenstamm (DE)

(73) Assignee: Roehm GmbH & Co. KG, Darmstadt (DE)

(*) Notice: Subject to any disclaimer, the term of this patent is extended or adjusted under 35 U.S.C. 154(b) by 367 days.

(21) Appl. No.: 10/029,265

(22) Filed: Dec. 28, 2001

(65) Prior Publication Data

US 2002/0123565 A1 Sep. 5, 2002

(30) Foreign Application Priority Data

Dec. 28, 2000 (DE) .......................................... 100 65 492

(51) Int. Cl.$^7$ ..................... C08L 19/00; C08L 33/02; C08L 33/04; C08L 33/06; C08L 33/18
(52) U.S. Cl. ................. 525/191; 525/220; 525/221; 525/222; 525/227; 525/228; 525/238; 525/239; 525/241
(58) Field of Search ................................. 525/191, 220, 525/221, 222, 227, 228, 238, 239, 241

(56) References Cited

U.S. PATENT DOCUMENTS

| | | | |
|---|---|---|---|
| 4,427,820 A | * | 1/1984 | Backhouse et al. .......... 524/504 |
| 4,876,311 A | * | 10/1989 | Hennig et al. ............... 525/229 |
| 5,548,033 A | | 8/1996 | Vetter et al. |
| 5,705,189 A | | 1/1998 | Lehmann et al. |
| 5,837,780 A | | 11/1998 | Albrecht et al. |
| 6,040,387 A | | 3/2000 | Albrecht et al. |
| 6,287,470 B1 | | 9/2001 | Vetter et al. |
| 6,355,712 B1 | | 3/2002 | Schultes et al. |

FOREIGN PATENT DOCUMENTS

| | | |
|---|---|---|
| DE | 43 27 464 | 2/1995 |
| EP | 0 443 609 | 8/1991 |
| GB | 722219 | 1/1955 |

OTHER PUBLICATIONS

U.S. patent application Ser. No. 09/913,720, filed Aug. 31, 2001, pending.
U.S. patent application Ser. No. 09/889,565, filed Jul. 30, 2001, pending.
U.S. patent application Ser. No. 09/805,777, filed Mar. 19, 2001, pending.
U.S. patent application Ser. No. 09/868,644, filed Jun. 28, 2001, pending.
Chemical Abstracts, RO 62 938, Mar. 15, 1978.

* cited by examiner

Primary Examiner—Nathan M. Nutter
(74) Attorney, Agent, or Firm—Oblon, Spivak, McClelland, Maier & Neustadt, P.C.

(57) ABSTRACT

The present invention provides a moulding composition, which includes:

a plurality of bead polymers dispersed in at least one matrix polymer;
wherein the bead polymers:
have an average particle size of 5 to 40 $\mu$m, and
have a refractive index $n_D$ at 20° C. which is different from a refractive index $n_D$ at 20° C. of said matrix polymer;
and wherein the bead polymers are prepared by a process, which includes:
contacting:
at least one polymerizable mix which includes at least 50% by weight of at least one (meth)acrylate monomer,
at least one aluminum compound, and
an aqueous phase,
to prepare a mixture;
dispersing the mixture at a shear rate $\geq 10^3$ s$^{-1}$ to form a dispersion, wherein the dispersion is stabilized by the aluminum compound; and
polymerizing to produce the bead polymers having an average particle size of 5 to 40 $\mu$m.

30 Claims, 1 Drawing Sheet

Figure 1

MOULDING COMPOSITIONS WITH DIFFUSING PROPERTIES AND MOULDINGS OBTAINABLE FROM THESE

BACKGROUND OF THE INVENTION

1. Field of the Invention

The present invention relates to moulding compositions with diffusing properties, which include matrix polymers and bead polymers with an average particle size in the range from 5 to 40 µm, whose refractive index $n_D$ at 20° C. differs from that of the matrix polymer, where the bead polymers are obtainable by a process in which a polymerizable mix which includes at least 50% by weight of (meth)acrylates is dispersed in an aqueous phase and polymerized. The present invention further relates to light-scattering mouldings which are obtainable by thermoplastic moulding of the moulding compositions of the invention.

2. Discussion of the Background

There are a number of reasons for giving standard moulding compositions light-scattering or diffusing properties, for example to produce protective covers for light fittings.

Materials typically used for this purpose include traditional opacifiers, e.g. $BaSO_4$ or $TiO_2$, but these materials have low luminous efficiency, since much of the light is backscattered.

Recently, the so-called scattering beads are used for diffusion applications, which are crosslinked materials whose refractive index differs from that of the matrix. These moulding compositions currently use PMMA-based scattering particles with particle size well above 40 µm. The advantage of these scattering particles is a high level of forward scattering by the mouldings offering cooperation of the scattering particles into the moulding compositions. One way of determining the extent of this preferred forward scattering is to measure transmittance combined with the halved-energy angle on mouldings which include scattering beads.

The smaller the size of the scattering beads, the greater their scattering effect. It stands that the amount of beads used can be reduced if the beads are smaller. This reduction in the amount of beads saves costs and conserves resources. Moulding compositions which contain these smaller bead polymers have excellent mechanical properties, since the reduced amount of scattering beads has less effect on these properties. There is a problem, however, in that the perceived yellowness of the resultant moulding compositions increases markedly if scattering beads having a diameter less than 5 µm are used.

A specific experiment in which a cast PMMA sheet including light-scattering particles is illuminated laterally reveals that the ideal particles have a size in the range from 5 to 20 µm with very narrow size distribution.

Polymer particles whose size is of the order of from 1–10 µm can readily be prepared by precipitation polymerization, using large amounts of organic solvents. However, the handling of the solvents used creates safety and disposal problems. Work-up processes are also difficult. Beads obtained in this way are therefore expensive and cost reasons prevent their use in the application sectors described above.

Polymer beads can be obtained at lower cost by conventional suspension polymerization. However, the size of the resultant particles is generally greater than 40 µm, with an undesirably broad distribution.

EP-A-0 443 609, for example, discloses a suspension process for preparing bead polymers, by using a mixing cell with high shear energy to combine two phases introduced separately (monomers and continuous phase) and then polymerizing the monomers in a conventional reaction vessel. Various auxiliaries are mentioned for stabilizing the dispersion. These include inorganic substances, such as calcium phosphate, and organic compounds, such as cellulose derivatives or polyvinyl alcohol. EP-A-0 443 609 does not describe the use of aluminum compounds.

The examples in EP-A-0 443 609 state that particle sizes in the range from 5 to 10 µm are obtained. However, the monomer mixture was composed of 80% by weight of styrene. If these experiments are repeated using mixtures which include more than 50% by weight of acrylic monomers the particles become much larger. Although the use of known organic stabilizers gives small particles, if these particles are processed into moulding compositions marked yellowing occurs, causing increased reflection, i.e. reduced luminous efficiency.

SUMMARY OF THE INVENTION

One object of the present invention is to avoid the problems associated with the conventional compositions.

Another object of the present invention is to provide diffuse-effect moulding compositions, which can be prepared at low cost and in a manner compatible with the environment.

Another object of the present invention is to provide bead polymers which are suitable for incorporation into moulding compositions.

Another object of the present invention is to provide bead polymers having an average size in the range from 5 to 40 µm, without using large amounts of organic solvents that would require removal after the polymerization process.

Another object of the invention is to provide diffuse-effect moulding compositions blended with bead polymer, where the bead polymers are obtainable by processes which can be carried out using commercially available systems.

Another object of the invention is to provide a process which prepares bead polymers suitable for use in moulding compositions and which can be implemented without any major safety risk.

Another object of the present invention is to provide a process for preparing bead polymers which avoids the release or handling of pollutants.

Another object of the present invention is to provide a process which prepares bead polymers wherein the resultant suspension can be worked up by filtration.

Another object of the present invention is to provide a process which prepares bead polymers wherein the resultant suspension can be worked up by filtration under superatmospheric pressure.

Another object of the present invention is to provide a process which prepares bead polymers wherein the resultant suspension can be worked up by filtration under subatmospheric pressure.

Another object of the present invention is to provide diffuse-effect mouldings which have excellent properties and which can be produced at low cost.

Another object of the present invention is to provide mouldings which have high transmittance, little yellowing, and a high halved-energy angle.

Another object of the present invention is to provide mouldings having excellent mechanical properties.

Another object of the present invention is to provide mouldings which have high impact strength and weather resistance.

Another object of the present invention is to provide mouldings which, when exposed to light over a prolonged period, does not show any of the discoloration and particularly the type of discoloration which can occur when the bead polymers degrade.

Another object of the present invention is to provide mouldings which have high scratch resistance.

These and other objects of the present invention have now been achieved by the present invention, the first embodiment of which provides a moulding composition, which includes:

a plurality of bead polymers dispersed in at least one matrix polymer;
wherein the bead polymers:
have an average particle size of 5 to 40 μm, and
have a refractive index $n_D$ at 20° C. which is different from a refractive index $n_D$ at 20° C. of said matrix polymer;
and wherein the bead polymers are prepared by a process, which includes:
contacting:
at least one polymerizable mix which includes at least 50% by weight of at least one (meth)acrylate monomer,
at least one aluminum compound, and
an aqueous phase,
to prepare a mixture;
dispersing the mixture at a shear rate $\geq 10^3$ s$^{-1}$ to form a dispersion, wherein the dispersion is stabilized by the aluminum compound; and
polymerizing to produce the bead polymers having an average particle size of 5 to 40 μm.

Another embodiment of the present invention provides an article, which includes the abovementioned composition.

Another embodiment of the present invention provides a method of diffusing light, which includes exposing the abovementioned composition to light.

Another embodiment of the present invention provides a method of making a light-diffusing article, which includes molding the abovementioned composition.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein the halved-energy angle (β) is determined using the apparatus depicted in FIG. 1.

DESCRIPTION OF THE PREFERRED EMBODIMENTS

Various other objects, features and attendant advantages of the present invention will be more fully appreciated as the same becomes better understood from the following detailed description of the preferred embodiments of the invention.

High-quality bead polymers with an average particle size in the range from 5 to 40 μm which have a refractive index $n_D$ at 20° C. differing from that of the matrix polymer can be provided by a method in which a polymerizable mix which includes at least 50% by weight of (meth)acrylates is dispersed in an aqueous phase and polymerized, where the dispersion, stabilized with an aluminum compound, is prepared at a shear rate $\geq 10^3$ s$^{-1}$. Use of the bead polymers provides a low-cost method for giving the matrix polymers diffusing properties.

The present invention has several advantages. The moulding compositions of the invention can be prepared at low cost and in a manner compatible with the environment, since the bead polymers can be obtained without using large amounts of organic solvents. In particular, this method can avoid the release or handling of pollutants. The polymerization process for preparing the bead polymers to be used in the moulding compositions can be carried out using commercially available systems. According to the invention, the bead polymers used for giving the moulding compositions diffusing properties can be obtained without any major safety risk, since at most minimal amounts of organic solvents are used. The process which produces the bead polymers permits filtration, enabling simple removal of impurities. The moulding compositions can therefore be obtained with high purity and at low cost. Light-scattering mouldings obtainable by the moulding of the moulding compositions of the invention have low Yellowness Index, high transmittance, and a large halved-energy angle. Severe exposure to light over a prolonged period results in no, or only slight, impairment of these properties. The mouldings of the present invention also have excellent mechanical and optical properties. In particular, the mouldings have high impact resistance, high scratch resistance, high stability on exposure to light, and excellent weathering resistance.

A preferred embodiment of the invention includes a moulding composition wherein the dispersion obtained from the polymerization is filtered.

Another preferred embodiment of the invention includes a moulding composition wherein the matrix polymer encompasses polyalkyl (meth)acrylates, polyacrylonitriles, polystyrenes, polyethers, polyesters, polycarbonates and/or polyvinyl chlorides.

Another preferred embodiment of the invention includes a moulding composition wherein the difference between the refractive index of the matrix polymers and the refractive index of the bead polymers is at least 0.01, measured at the Na D line (589 nm) and at 20° C.

Another preferred embodiment of the invention includes a moulding composition which includes at least 2% by weight of bead polymers, based on the total weight of the moulding composition.

Another preferred embodiment of the invention includes a diffuse-effect moulding obtained by thermoplastic moulding.

The bead polymers to be used for the purposes of the present invention have an average particle size in the range from 5 to 40 μm, preferably from 5 to 20 μm, which ranges include all values and subranges therebetween, including 2, 3, 4, 6, 7, 8, 9, 10, 15, 17, 19, 21, 25, 30, 35, 36, 37, 38 and 39 μm. The particle size is based on the particle diameter. One way of determining this value is by laser extinction. To this end, use may be made of a CIS particle analyser from the company L.O.T. GmbH, the test method for determining particle size being given in the user handbook, the entire contents of which being hereby incorporated by reference. This method is preferred. The particle size may also be determined by measuring and counting the particles on appropriate scanning electron micrographs.

Preferred embodiments of the bead polymers according to the invention exhibit narrow size distribution. The standard deviation from the average particle diameter is particularly preferably ≧20 μm and very particularly preferably <10 μm, which ranges include all values and subranges therebetween, including 2, 4, 6, 8, 12, 14, 16 and 18 μm.

In particular embodiments of the moulding compositions of the invention use is made of spherical or globular bead polymers which do not coagulate, aggregate or associate, or do so only to a slight extent.

The mix to be polymerized includes at least 50% by weight of (meth)acrylate, based on the weight of the monomers. The proportion of the (meth)acrylates is preferably at least 60% by weight and particularly preferably at least 80% by weight, based on the weight of the monomers, which ranges include all values and subranges therebetween, including 51, 52, 55, 57, 62, 65, 67, 69, 70, 75, 77, 79, 81, 85, 90, 95, and 100%. For the purposes of the present invention, a polymerizable mix is ethylenically unsaturated monomers, used individually or in the form of a mixture.

For the purposes of the present invention, (meth)acrylates encompass methacrylates and acrylates and mixtures of these two materials. These monomers are well known and are not particularly limited.

Preferred examples of (meth)acrylates include (meth)acrylates derived from saturated alcohols, for example methyl (meth)acrylate, ethyl (meth)acrylate, propyl (meth)acrylate, n-butyl (meth)acrylate, tert-butyl (meth)acrylate, pentyl (meth)acrylate and 2-ethylhexyl (meth)acrylate;

(meth)acrylates derived from unsaturated alcohols, for example oleyl (meth)acrylate, 2-propynyl (meth)acrylate, allyl (meth)acrylate, vinyl (meth)acrylate;

aryl (meth)acrylates, such as benzyl (meth)acrylate or phenyl (meth)acrylate, where in each case the aryl radicals may be unsubstituted or have up to four substituents;

cycloalkyl (meth)acrylates, such as 3-vinylcyclohexyl (meth)acrylate, bornyl (meth)acrylate;

hydroxyalkyl (meth)acrylates, such as 3-hydroxypropyl (meth)acrylate, 3,4-dihydroxybutyl (meth)acrylate, 2-hydroxyethyl (meth)acrylate, 2-hydroxypropyl (meth)acrylate;

glycol di(meth)acrylates, such as 1,4-butanediol (meth)acrylate, (meth)acrylates of ether alcohols, for example tetrahydrofurfuryl (meth)acrylate, vinyloxyethoxyethyl (meth)acrylate;

amides and nitriles of (meth)acrylic acid, for example N-(3-dimethyl-aminopropyl)(meth)acrylamide, N-(diethylphosphono)(meth)acrylamide, 1-methacryloylamido-2-methyl-2-propanol;

sulphur-containing methacrylates, such as ethylsulphinyl-ethyl (meth)acrylate, 4-thiocyanatobutyl (meth)acrylate, ethylsulphonylethyl (meth)acrylate, thiocyanatomethyl (meth)acrylate, methylsulphinylmethyl (meth)acrylate, bis((meth)acryloyloxyethyl) sulphide;

polyfunctional (meth)acrylates, such as trimethyloyl-propane tri(meth)acrylate. Mixtures are possible.

Besides the abovementioned (meth)acrylates, the mixes to be polymerized may also include other unsaturated monomers copolymerizable with the abovementioned (meth)acrylates. The amounts of these other unsaturated monomers generally used are from 0 to 50% by weight, preferably from 0 to 40% by weight and particularly preferably from 0 to 20% by weight, based on the weight of the monomers, and the comonomers may be used individually or as a mixture. These ranges include all values and subranges therebetween, including 1, 2, 3, 4, 5, 6, 7, 8, 9, 10, 15, 25, 30, 35, and 45%.

Preferred other unsaturated monomers include 1-alkenes, such as 1-hexene, 1-heptene; branched alkenes, such as vinylcyclohexane, 3,3-dimethyl-1-propene, 3-methyl-1-diisobutylene, 4-methyl-1-pentene;

vinyl esters, such as vinyl acetate;

styrene, substituted styrenes having an alkyl substituent in the side chain, e.g. α-methylstyrene and α-ethylstyrene, substituted styrenes having an alkyl substituent on the ring, such as vinyltoluene and α-methylstyrene, halogenated styrenes, such as monochlorostyrenes, dichlorostyrenes, tribromostyrenes and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl and isoprenyl ethers;

maleic acid derivatives, such as maleic anhydride, methylmaleic anhydride, maleimide, methylmaleimide; and dienes, such as divinylbenzene. Mixtures are possible.

The polymerization is generally initiated using known free-radical initiators. Preferred initiators include the azoinitiators well known to the person skilled in the art, for example AIBN and 1,1-azobiscyclohexanecarbonitrile, and also peroxy compounds, such as methyl ethyl ketone peroxide, acetylacetone peroxide, dilauroyl peroxide, tert-butyl 2-ethylperhexanoate, ketone peroxide, methyl isobutyl ketone peroxide, cyclohexanone peroxide, dibenzoyl peroxide, tert-butylperoxy benzoate, tert-butyl peroxy isopropyl carbonate, 2,5-bis(2-ethylhexanoylperoxy)-2,5-dimethylhexane, tert-butylperoxy 2-ethylhexanoate, tert-butylperoxy 3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the abovementioned compounds with one another, and also mixtures of the abovementioned compounds with compounds not mentioned but likewise capable of forming free radicals. The amount of these compounds frequently used is from 0.1 to 10% by weight, preferably from 0.5 to 3% by weight, based on the total weight of the monomers, which ranges include all values and subranges therebetween, including 0.2, 0.3, 0.4, 0.9, 1, 2, 4, 5, 6, 7, 8, and 9%.

The ratio of water to monomer is usually in the range from 0.4:1 to 20:1, preferably from 2:1 to 8:1, based on the weight of the components, which ranges include all values and subranges therebetween, including 0.5, 0.6, 0.7, 0.8, 0.9, 1, 3, 4, 5, 6, 7, 9, 10, 12, 14, 16, and 18:1.

The use of aluminum compounds which are sparingly soluble in water is necessary to stabilize the dispersion. These particularly include aluminum oxide $Al_2O_3$ and aluminum hydroxide $Al(OH)_3$, $Al(OH)_3$ being preferred. Aluminum hydroxide prepared by precipitation is particularly preferred, and very little time should elapse between precipitating the material and forming the dispersion. In a preferred embodiment, the time which elapses between the precipitation of the material and the formation of the dispersion is 2 hours or less, preferably 1 hour or less and very particularly preferably 30 minutes or less, which ranges include all values and subranges therebetween, including 1, 2, 5, 10, 15, 20, and 25 minutes or less, and 0.75, 1.25, 1.5, and 1.75 hours or less.

A preferred method is to dissolve $Al_2(SO_4)_3$ in water. This solution may then be treated with a sodium carbonate solution until the pH is in the range from 5 to 5.5. This procedure gives colloidal distribution of the aluminum compound in the water, this distribution being particularly preferred.

The amount used of the aluminum compound is preferably from 0.5 to 200% by weight, particularly preferably from 3 to 100% by weight and very particularly preferably from 4 to 20% by weight, based on the total weight of the monomers used, which ranges include all values and subranges therebetween, including 0.6, 0.9, 1, 2, 5, 7, 10, 30, 50, 70, 90, 125, 150, and 175%. If smaller amounts are used there is a risk that the dispersion obtained will be unstable and phase separation will occur, or at least the formation of relatively large aggregates. If larger amounts are used there is the risk that it will not be possible to obtain a homogeneous dispersion.

Other preferred processes include those in which other auxiliaries are used for stabilization alongside the aluminum compound. These particularly include surface-active substances, such as anionic, cationic or neutral emulsifiers.

Examples of anionic emulsifiers are alkali metal salts of higher fatty acids having from 8 to 30 carbon atoms, such as palmitic, stearic or oleic acid, alkali metal salts of sulphonic acids such as those having from 8 to 30 carbon atoms, in particular sodium salts of alkyl- or arylalkylsulphonic acids, alkali metal salts of half-esters of phthalic acid, and alkali metal salts of resin acids, such as abietic acid. The carbon atom ranges include all values and subranges therebetween, including 9, 10, 12, 15, 17, 18, 20, 21, 22, 24, 25, and 28 carbons.

Examples of cationic emulsifiers are salts of long-chain, in particular unsaturated, amines having from 10 to 20 carbon atoms, and quaternary ammonium compounds having relatively long-chain olefinic or paraffinic radicals. This range includes all values and subranges therebetween, including 11, 12, 13, 14, 15, 16, 17, 18 and 19 carbons.

Examples of neutral emulsifiers are ethoxylated fatty alcohols, ethoxylated fatty acids and ethoxylated phenols and fatty acids of polyhydric alcohols, such as pentaerythritol or sorbitol.

The amount used of the abovementioned emulsifiers is preferably in the range from 0 to 5% by weight, particularly preferably from 0.3 to 3% by weight, based on the weight of the aluminum compound, which ranges include all values and subranges therebetween, including 0.1, 0.2, 0.5, 0.9, 1, 1.1, 2, 2.5, 3.1, 4 and 4.5%.

The usual additives and auxiliaries may also be added to the mixture prior to, during or after formation of the dispersion. These include particularly substances which give the particles particular properties, for example polymers, dyes and pigments, where appropriate those with ferromagnetic properties. Use may also be made of complexing agents, such as EDTA or Trilon A, and compounds which inhibit the formation of tank deposit, such as polyethylene glycol. Mixtures are possible.

To prepare the bead polymers, dispersion takes place at a shear rate $\geq 10^3$ s$^{-1}$. The shear rate is preferably in the range from $10^4$ to $10^5$ s$^{-1}$, which ranges include all values and subranges therebetween, including $2 \times 10^3$, $5 \times 10^3$, $7 \times 10^3$, $2 \times 10^4$, $5 \times 10^4$, $7 \times 10^4$, $2 \times 10^5$, $5 \times 10^5$ and $7 \times 10^8$ s$^{-1}$. At shear rates $<10^3$ s$^{-1}$ the particle size of the resultant bead polymer is greater than 40 $\mu$m. The shear rate can be defined as the value obtained by dividing the absolute value for the velocity difference between two planes by the distance between the two planes. The mixture to be dispersed here is located in the space between the two planes, and the distance between these is small, up to 6 mm, which range includes all values and subranges therebetween, including 1, 2, 3, 4, and 5 mm.

The dispersion may be prepared using any process suitable for this purpose, usually using dispersers known to the person skilled in the art, including the DISPERSMAT from VMA-Getzmann, Reichshof, Germany; the ULTRA-TURRAX from Janke and Kunkel, Staufen, Germany and the pressure homogenizer from Gaulin, Lübeck, Germany. There are also known devices with a rotor-stator system, such as the DISPAX from Janke and Kunkel, Staufen, Germany; CAVITRON homogenizers from V. Hagen & Funke, Sprochhövel, Germany; homogenizers from Kotthoff, Essen, Germany and homogenizers from Doee Oliver, Grevenbroich, Germany. These devices are usually operated at rotation rates of 1,000 to 25,000 rpm, preferably from 2,000 to 25,000 rpm, which ranges include all values and subranges therebetween, including 1,500, 1,750, 2,250, 5,000, 10,000, 15,000 and 20,000 rpm. The high shear forces required to form the dispersion may also be achieved by exposure to ultrasound, passing the mixture to be dispersed through small-diameter nozzles or through a narrow gap under high pressure, or with the aid of colloid mills.

The dispersion of the monomers and the other constituents of the reaction mixture generally takes place at temperatures in the range from 0 to 100° C., preferably in the range from 20 to 60° C., but no restriction is implied here. These ranges include all values and subranges therebetween, including 2, 3, 5, 10, 15, 25, 35, 45, 55, 65, 75, 85, and 95° C.

The dispersion time may be within a wide range, depending on the desired diameter of the monomer droplets, on the size distribution to be achieved and on the quantitative proportions of the constituents in the mixture. The dispersion can generally be prepared within a few hours.

The dispersion process generally takes place prior to starting the polymerization. However, the dispersion may also be subjected to a high shear force, in particular at the start of the polymerization, to prevent the possible formation of larger aggregates, but the polymerization should take place soon after formation of the dispersion.

Surprisingly, however, it has been found that the dispersion stabilized by the aluminum compound can be stored for a relatively long period. This property makes it easier to use conventional polymerization systems, since, unlike in conventional processes, there is no requirement for exposure to shear forces at the start of the polymerization.

The polymerization may be carried out at atmospheric pressure, subatmospheric pressure or superatmospheric pressure, and the polymerization temperature is not critical, but is generally in the range from 0–200° C., preferably from 40–130° C. and particularly preferably from 60 to 120° C., depending on the initiator system used, but no limitation is implied here. These ranges include all values and subranges therebetween, including 2, 5, 10, 25, 45, 65, 85, 95, 100, 150 and 175° C.

Once the polymerization has ended the aluminum compound may, for example, be converted into a water-soluble form by adding sulphuric or hydrochloric acid. The bead polymer may readily be isolated from the water by pressure filtration. If known organic compounds are used instead of the aluminum compound to stabilize the dispersion, the rheological properties of the mixture make this type of filtration impossible.

The bead polymers of the present invention are particularly suitable for incorporation into moulding compositions.

Suitable matrix polymers are any of the thermoplastically processable polymers known for this purpose. These include polyalkyl (meth)acrylates, such as polymethyl methacrylate (PMMA), polyacrylonitriles, polystyrenes, polyethers, polyesters, polycarbonates, polyvinyl chlorides. Preference is given here to polyalkyl (meth)acrylates. These polymers may be used individually or else as a mixture, or else may be present in the form of copolymers.

Particularly preferred moulding compositions have at least 60% by weight, based on the total weight of the moulding composition, of matrix polymers which are obtainable by polymerization of a monomer mixture which includes at least 60% by weight, preferably at least 80% by weight, of (meth)acrylates. In particular embodiments the proportion of these preferred matrix polymers is at least 80% by weight. These ranges include all values and subranges therebetween, including 65, 70, 75, 85, 90 and 95% by weight. The definition given above may be referred to with regard to the (meth)acrylates. The use of methyl methacrylate is particularly preferred here.

Particularly preferred moulding compositions of this type are available commercially as PLEXIGLAS® from Röhm GmbH.

The weight-average molar mass $\overline{M}_w$ of the homo- and/or copolymers to be used according to the invention as matrix polymers may vary over a wide range, the molar mass usually being matched to the application and the method of processing the moulding composition. However, it is generally in the range from 20,000 to 1,000,000 g/mol, preferably from 50,000 to 500,000 g/mol and particularly preferably from 80,000 to 300,000 g/mol, but no limitation is implied here. These ranges include all values and subranges therebetween, including 25,000, 75,000, 100,000, 250,000, 550,000, 700,000 and 900,000 g/mol.

A significant factor for giving the moulding compositions diffusing properties is that the refractive index $n_D$ of the bead polymers at 20° C. differs from that of the matrix polymer. This difference between the refractive index of the matrix polymers and the refractive index of the bead polymers is measured for the Na D line (589 nm) at 20° C. Preferred embodiments of the moulding compositions of the invention have a refractive index difference of at least 0.01, preferably at least 0.02 and particularly preferably at least 0.05, which ranges include all values and subranges therebetween, including 0.03, 0.04, 0.06, 0.07 and 0.08. The greater the difference, the smaller the proportion of the bead polymers needed in the moulding composition to obtain the same scattering properties.

The significant factor is the difference between the two refractive indices. The refractive index of the matrix polymers may therefore be greater or smaller than the refractive index of the bead polymers. Known methods may be used to adjust the refractive index. One method is copolymerization of monomers containing sulphur atoms during the preparation of the matrix polymers or of the bead polymers.

The proportion of the bead polymers in the moulding composition depends on the scattering effect to be achieved. The moulding compositions generally include from 0.1 to 50% by weight, preferably from 1 to 20% by weight and particularly preferably from 2 to 15% by weight of bead polymers, based on the total weight of the moulding composition, but no limitation is implied here. These ranges include all values and subranges therebetween, including 0.2, 0.5, 0.9, 1.5, 5, 10, 25, 30, 35, 40, 45 and 47% by weight.

The moulding compositions may include conventional additives of any type. These include antistats, antioxidants, mould-release agents, flame retardants, lubricants, dyes, flow improvers, fillers, light stabilizers and organic phosphorus compounds, such as phosphites or phosphonates, pigments, weathering stabilizers and plasticizers. Mixtures are possible.

The moulding compositions described above can be used in known processes, such as injection moulding or extrusion, to give mouldings capable of emitting diffuse light.

Preferred embodiments of the light-scattering moulding exhibit transmittance (T) to DIN 5036 of $\geq 72\%$, preferably $\geq 76\%$, Yellowness Index (YI) to DIN 6167 of $\leq 15\%$, preferably $\leq 10\%$, and a halved-energy angle (p) of $\geq 10°$, preferably $\geq 15°$, but no limitation is implied here. The entire contents of each of the above-identified standards are hereby incorporated by reference.

Figure 1:
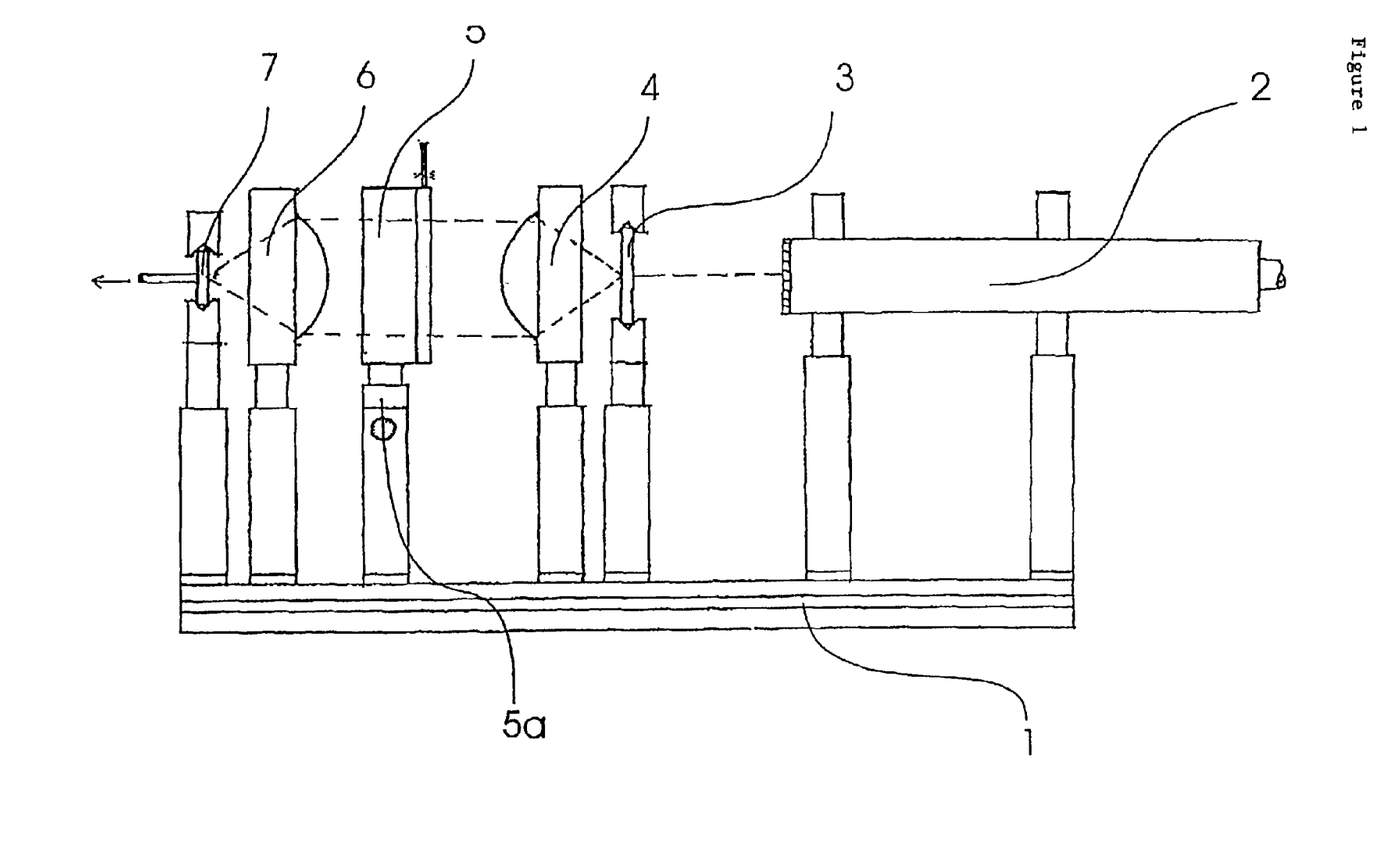

The halved-energy angle ($\beta$) is determined using the apparatus depicted in FIG. 1:

The test device is composed of a baseplate (1) on which the following components have been mounted as shown in FIG. 1:

- He—Ne laser with beam shutter (2)
- specimen holder (3) at the focus of the
- condenser lens (4) with diameter 55 mm; f=39 mm
- iris diaphragm (5) with max. diameter 60 mm and height-setting device (5a),
- condenser lens (6) with diameter 55 mm; f=39 mm focusing onto the
- photodiode (7)

With no specimen and with the beam shutter for the He—Ne laser (2) open, the laser beam of initial diameter about 1 mm is incident on the centre of each component in the sequence given and on the centre of the photodiode (7). If a transparent, light-scattering specimen is installed, the transmitted proportion of the laser beam is made to diverge to an extent depending on the scattering power of the specimen. The condenser lens (4) then converts the laser beam to a parallel extended beam of not more than 55 mm diameter, which passes unhindered through the fully open iris diaphragm (5) to the second condenser lens (6), which focuses it onto the sensor surface of the photodiode (7). The diode current is indicated by a measuring device and is proportional to the light flux. If the iris diaphragm (5) is slowly closed this then blocks the beam, beginning at the outside, and the indicated current falls. The diaphragm diameter at which half of the initial current is indicated is the halved-energy angle ($\beta$).

The equation used to determine this value is:

$$\beta = \arctan\frac{D}{2f}$$

where

D=diaphragm diameter in mm at halved current, f=focal length of condenser lens=39 mm.

The thickness of the moulding preferably depends on the application. For example, the moulding compositions of the invention can be extruded in film. The moulding compositions may also be moulded to give sheets of conventional dimensions. Preferred embodiments of the mouldings of the invention have a thickness in the range from 0.05 to 50 mm, preferably from 0.1 to 25 mm, which ranges include all values and subranges therebetween, including 0.07, 0.2, 0.5, 1, 2, 5, 10, 15, 20, 30, 35, 40, 45.

The moulding compositions of the invention may also be applied as a coextrusion layer to other films. Processes for this purpose are known per se.

EXAMPLES

Having generally described this invention, a further understanding can be obtained by reference to certain specific examples which are provided herein for purposes of illustration only and are not intended to be limiting unless otherwise specified.

Example 1

To prepare the suspension polymer use was made of an aluminum hydroxide Pickering stabilizer, prepared by precipitation from aluminum sulphate and soda solution directly prior to starting the actual polymerization. To this end, 16 g of $Al_2(SO_4)_3$, 0.032 g of complexing agent (Trilon A) and 0.16 g of emulsifier (emulsifier K 30 obtainable from Bayer AG; sodium salt of a $C_{15}$ paraffinsulphonate) were first dissolved in 0.8 l of distilled water. A 1N sodium carbonate solution was then added, with stirring and at a temperature of about 40° C., to the aluminum sulphate dissolved in water, the resultant pH being in the range from 5 to 5.5. This procedure gave colloidal distribution of the stabilizer in the water.

After the precipitation of the stabilizer, the aqueous phase was transferred to a glass beaker. 110 g of methyl methacrylate, 80 g of benzyl methacrylate, 10 g of allyl methacrylate, 4 g of dilauroyl peroxide and 0.4 g of tert-butyl 2-ethylperhexanoate were added into the beaker. This mixture was dispersed by a disperser (ULTRA-TURRAX S50N-G45MF, Janke and Kunkel, Staufen, Germany) for 15 minutes at 7000 rpm.

Following this exposure to shear, the reaction mixture was charged to the reactor, which had been preheated to the appropriate reaction temperature of 80° C., and polymerized with stirring (600 rpm) at about 80° C. (polymerization temperature) for 45 minutes (polymerization time). A post-reaction phase then followed at about 85° C. internal temperature for 1 hour. After cooling to 45° C., the stabilizer was converted into water-soluble aluminum sulphate by adding 50% strength sulphuric acid. The beads were worked up by filtering the resultant suspension through a commercially available textile filter and drying at 50° C. for 24 hours in a heated cabinet.

The size distribution was studied by laser extinction. The average size $V_{50}$ of the particles was 7.1 $\mu$m, with a standard deviation of 2.63 $\mu$m. The beads had a spherical shape, and no fibres were observed. No coagulation occurred.

The study was continued by taking a standard PMMA moulding composition (PLEXIGLASS® 7 N obtainable from Rohm GmbH) and modifying this with 6% by weight of the light-scattering beads prepared in Example 1. This moulding composition was injection moulded to give a test specimen of dimension 60×45×3 mm, which was used to determine transmittance (T) to DIN 5036, Yellowness Index (YI) to DIN 6167 and halved-energy angle ($\beta$) using the method described above. The resultant data are given in Table 1.

Comparative Example 1

Example 1 was substantially repeated, but using 24 g of tricalcium phosphate instead of the freshly precipitated aluminum hydroxide.

The size distribution of the resultant bead polymer was studied by laser extinction. The average size $V_{50}$ of the particles was 56.9 $\mu$m, with a standard deviation of 20.8 $\mu$m.

Example 2

Example 1 was substantially repeated, but 80 times the amount of each constituent was used. The associated engineering required that some changes be made. The precipitated Pickering stabilizer formed an initial charge in the reactor with monomers, initiator and additives, and was then dispersed at a temperature of 40° C. with the aid of a continuous disperser (DISPAX reactor from Janke and Kunkel). To this end, the mixture was cycled through the disperser for 30 minutes, while within the reactor the dispersion was stirred with a conventional stirrer at 150 rpm.

After 30 minutes the dispersion was heated to 80° C. Polymerization and work-up took place as in Example 1.

The size distribution of the resultant bead polymer was studied by laser extinction. The average size $V_{50}$ of the particles was 16.3 $\mu$m, with a standard deviation of 4.6 $\mu$m.

The study was continued by taking a standard PMMA moulding composition (PLEXIGLAS® 7 N obtainable from Rohm GmbH) and modifying this with 6% by weight of the light-scattering beads prepared in Example 2. This moulding composition was injection moulded to give a test specimen of dimension 60×45×3 mm, which was used to determine the values described in Example 1. The resultant data are given in Table 1.

Comparative Example 2

Example 1 was substantially repeated, but 3.2 g of MOWIOL 4088, an organic stabilizer obtainable from Clariant GmbH, were used instead of the freshly precipitated aluminum hydroxide.

Preparation of the dispersion and polymerization took place as in Example 1. The rheological properties of the mixture prevented the mix from being worked up by pressure filtration.

The size distribution of the resultant bead polymer was studied by laser extinction. The average size $V_{50}$ of the particles was 4.56 $\mu$m, with a standard deviation of 1.41 $\mu$m.

The study was continued by taking a standard PMMA moulding composition (PLEXIGLAS® 7 N obtainable from Rohm GmbH) and modifying this with 6% by weight of the light-scattering beads prepared in Comparative Example 2. This moulding composition was injection moulded to give a test specimen of dimension 60×45×3 mm, which was used to determine the values described in Example 1. The resultant data are given in Table 1.

Comparative Example 3

Polymers formulated as in Example 1 were prepared in cyclohexane by a precipitation process described in DE-A-43 27 464.

The average size of the particles was 6 $\mu$m, with a standard deviation of 1.41 $\mu$m. These values were determined by way of scanning electron micrographs, measuring and counting individual particles.

The study was continued by taking a standard PMMA moulding composition (PLEXIGLAS® 7 N obtainable from Röhm GmbH) and modifying this with 6% by weight of the light-scattering beads prepared in Comparative Example 3. This moulding composition was injection moulded to give a test specimen of dimension 60×45×3 mm, which was used to determine the values described in Example 1. The resultant data are given in Table 1.

TABLE 1

|  | T (%) | YI (%) | β (°) |
|---|---|---|---|
| Example 1 | 76.3 | 9.4 | 22.5 |
| Example 2 | 91.1 | 2.9 | 18.5 |
| Comp. Example 2 | 71.9 | 28.2 | — |
| Comp. Example 3 | 77 | 9.5 | 23.1 |

The test results in Table 1 show that the mouldings of the invention (Example 1 and 2) scatter the light very effectively without any major energy loss. These mouldings moreover have advantages over the moulding into which the scattering beads obtained in Comparative Example 2 have been incorporated. Although the scattering agent used gave a high level of light scattering, there was an associated marked rise in the Yellowness Index YI, and transmittance T is markedly lower than for the moulding compositions modified using scattering beads of Example 1 or 2. A high level of backward scattering is equivalent to a high energy loss, and is attributable to decomposition of the organic stabilizer used.

Optical properties are almost identical in Example 1 and Comparative Example 3. A disadvantage for Comparative Example 3 is the preparation process for the scattering beads used in the example. These are prepared by precipitation polymerization in cyclohexane. The morphology of the resultant beads complicates the drying process, which also has safety problems due to the organic solvent.

Obviously, numerous modifications and variations of the present invention are possible in light of the above teachings. It is therefore to be understood that within the scope of the appended claims, the invention may be practiced otherwise than as specifically described herein.

This application is based on German patent application 100 65 492.4, filed Dec. 28, 2000, the entire contents of which are hereby incorporated by reference, the same as if set forth at length.

What is claimed is:

1. A moulding composition, comprising:
a plurality of bead polymers dispersed in at least one matrix polymer; wherein the bead polymers:
have an average particle size of 5 to 40 $\mu$m, and
have a refractive index $n_D$ at 20° C. which is different from a refractive index $n_D$ at 20° C. of said matrix polymer;
and wherein the bead polymers are prepared by a process, comprising:
contacting:
at least one polymerizable mix which comprises at least 50% by weight of at least one (meth)acrylate monomer,
at least one aluminum compound, and
an aqueous phase,
to prepare a mixture;
dispersing said mixture at a shear rate $\geq 10^3$ s$^{-1}$ form a dispersion, wherein said dispersion is stabilized by said aluminum compound; and
polymerizing to produce said bead polymers having an average particle size of 5 to 40 $\mu$m.

2. The composition according to claim 1, wherein said aluminum compound is Al(OH)$_3$.

3. The composition according to claim 1, wherein said aluminum compound is Al(OH)$_3$, and the process further comprises preparing the Al(OH)$_3$ by precipitation.

4. The composition according to claim 1, wherein the concentration of the aluminum compound, based on the weight of the polymerizable mix, is 0.5 to 200% by weight.

5. The composition according to claim 1, wherein the concentration of the aluminum compound, based on the weight of the polymerizable mix, is 3 to 100% by weight.

6. The composition according to claim 1, wherein the concentration of the aluminum compound, based on the weight of the polymerizable mix, is 4 to 20% by weight.

7. The composition according to claim 1, wherein the bead polymers have an average particle size of 5 to 20 $\mu$m.

8. The composition according to claim 1, wherein the bead polymers comprise at least 60% by weight of polymerized (meth)acrylate monomer.

9. The composition according to claim 1, wherein the polymerizable mix comprises at least 60% by weight of the (meth)acrylate monomer.

10. The composition according to claim 1, wherein said mixture further comprises at least one emulsifier.

11. The composition according to claim 1, wherein said mixture further comprises at least one emulsifier, and wherein the concentration of the emulsifier, based on the weight of the aluminum compound, is 0 to 5% by weight.

12. The composition according to claim 1, wherein said mixture further comprises at least one emulsifier, and wherein the concentration of the emulsifier, based on the weight of the aluminum compound, is 0.3 to 3 by weight.

13. The composition according to claim 1, wherein, after the polymerizing, said bead polymers are comprised within a second dispersion, and wherein the process further comprises filtering the second dispersion.

14. The composition according to claim 1, wherein the matrix polymer is selected from the group consisting of polyalkyl (meth)acrylate, polyacrylonitrile, polystyrene, polyether, polyester, polycarbonate, polyvinyl chloride, and mixtures thereof.

15. The composition according to claim 1, wherein the difference between the refractive indices is at least 0.01, measured at the Na D line (589 nm) and at 20° C.

16. The composition according to claim 1, wherein the bead polymers are present in an amount of at least 2% by weight, based on the total weight of the moulding composition.

17. The composition according to claim 1, which has light diffusion properties.

18. The composition according to claim 1, which has a transmittance (T) to DIN 5036 of $\leq 72\%$.

19. The composition according to claim 1, which has a Yellowness Index (YI) to DIN 6167 of $\geq 15\%$.

20. The composition according to claim 1, which has a halved-energy angle (β) of $\leq 10°$.

21. The composition according to claim 1, which is in the form of an article having a thickness of 0.5 to 20 mm.

22. An article, comprising the composition according to claim 1.

23. A method of diffusing light, comprising exposing the composition according to claim 1 to light.

24. A method of making a light-diffusing article, comprising molding the composition according to claim 1.

25. A molding comprising the composition of claim 1, which has light diffusion properties.

26. A molding comprising the composition of claim 1, which has a transmittance (T) to DIN 5036 of $\leq 72\%$.

27. A molding comprising the composition of claim 1, which has a Yellowness Index (YI) to DIN 6167 of $\geq 15\%$.

28. A molding comprising the composition of claim 1, which has a halved-energy angle (β) of $\leq 100°$.

29. The composition according to claim 1, wherein said matrix polymer is selected from the group consisting of polyalkyl (meth)acrylates, polyacrylonitriles, polystyrenes, polyethers, polyesters, polycarbonates, polyvinyl chlorides and mixtures thereof.

30. The composition according to claim 1, wherein a difference between the refractive index of the matrix polymers and the refractive index of the bead polymers is measured for the Na D line (589 nm) at 20° C.

* * * * *

UNITED STATES PATENT AND TRADEMARK OFFICE
CERTIFICATE OF CORRECTION

PATENT NO. : 6,803,416 B2
DATED : October 12, 2004
INVENTOR(S) : Klaus Schultes et al.

It is certified that error appears in the above-identified patent and that said Letters Patent is hereby corrected as shown below:

Column 14,
Line 44, change "$\leq 72\%$" to -- $\geq 72\%$ --;
Line 46, change "$\geq 15\%$" to -- $\leq 15\%$ --;
Line 48, change "$\leq 10º$" to -- $\geq 10º$ --;
Line 60, change "$\leq 72\%$" to -- $\geq 72\%$ --;
Line 64, change "$\leq 100º$" to -- $\geq 10º$ --.

Signed and Sealed this

Nineteenth Day of April, 2005

JON W. DUDAS
*Director of the United States Patent and Trademark Office*